Patented Nov. 21, 1939

2,181,034

UNITED STATES PATENT OFFICE 2,181,034

PREPARATION OF 1-AMINO-6-CHLOROANTHRAQUINONE

Myron S. Whelen, Milwaukee, Wis., assignor to E. I. du Pont de Nemours & Company, Wilmington, Del., a corporation of Delaware No Drawing. Application June 24, 1936, Serial No. 87,121

5 Claims. (Cl. 260—381)

This invention relates to a new and improved process for the preparation of 1-amino-6-chloroanthraquinone.

Heretofore 1-amino-6-chloroanthraquinone has been prepared by the nitration of anthraquinone-beta-sulfonic acid sodium salt with subsequent separation of the isomers, replacement of the sulfonic acid with chlorine, and reduction of the nitro group. This process, however, is a very delicate one and is not practical for the commercial preparation of this product.

It is an object of the present invention to provide a new and improved process for the preparation of 1-amino-6-chloroanthraquinone which is simple and economical and particularly suitable for its commercial preparation.

It is a further object of this invention to prepare 1-p-toluolsulfonamido-6-chloroanthraquinone as a new compound, from which 1-amino-6-chloroanthraquinone can be directly obtained.

According to this invention, 1,6-dichloroanthraquinone is selectively amidated using p-toluenesulfonamide to give a practically pure 1-p-toluolsulfonamido-6-chloroanthroquinone. In carrying out the reaction an amount of p-toluenesulfonamide only slightly in excess of that theoretically required for the mono-amidation is used. The reaction is carried out in the presence of a copper catalyst and an acid binding agent. The resulting 1-p-toluolsulfonamido-6-chloroanthraquinone may be hydrolyzed in sulfuric acid and the 1-amino-6-chloroanthraquinone isolated in the form of its sulfate by a limited dilution of the sulfuric acid mass, or by drowning the mass in water.

The following examples are given to more fully illustrate the invention. The parts used are by weight.

Example 1

50 parts of 1,6-dichloroanthraquinone (M. P. 202–204° C.), 150 parts of nitrobenzene, 16.5 parts of sodium acetate, 0.5 part of copper acetate and 31 parts of p-toluenesulfonamide are heated together at 175° C. for about six hours. The reaction mass is then cooled to about 140° C. and diluted with about 150 parts of solvent naphtha. The mass after cooling is filtered, the cake washed with a small amount of solvent naphtha and steam distilled to remove this latter solvent and dried.

The product so obtained, which is relatively pure 1-p-toluenesulfonamido-6-chloroanthraquinone, is a highly crystalline yellow body. It is converted to 1-amino-6-chloroanthraquinone as follows:

10 parts of this material are dissolved in 100 parts of concentrated sulfuric acid. It is heated gently while stirring for several hours. The 1-amino-6-chloroanthraquinone is separated by drowning in water, filtering and washing free from acid. It is bright red in color and has a melting point of 208–213° C. If desired, the 1-amino-6-chloroanthraquinone may be isolated as a sulfate from the sulfuric acid by diluting to about 70% $H_2SO_4$, filtering, washing with 70% $H_2SO_4$ and then with hot water to completely hydrolyze the sulfate and wash out the remaining sulfuric acid. The resulting material has a melting point of about 213° C.

Example 2

50 parts of 1,6-dichloroanthraquinone (M. P. 202–204° C.), 150 parts of ortho-dichlorobenzene, 20 parts of soda ash, 0.5 part of copper chloride and 31 parts of p-toluenesulfonamide are heated together at about 170° C. for about eight hours. The reaction mass is then cooled to about 140° C. and diluted with about 150 parts of solvent naphtha. The mass, after cooling, is filtered; the cake is washed with a small amount of solvent naphtha, then steam distilled to remove this latter solvent and dried.

The hydrolysis to 1-amino-6-chloroanthraquinone is then effected in a manner analogous to that shown in Example 1.

The amidation is preferably carried out at temperatures not above about 180° C., since higher temperatures tend to give a more impure product. Any inert organic solvent may be used as a medium in which to carry out the reaction, such as naphthalene, nitrobenzene, ortho-dichlorobenzene, etc. Any of the commonly used acid binding agents may be employed.

Hydrolysis of the p-toluenesulfonamide compound may be carried out at any temperature, although room temperature or slightly elevated temperatures give satisfactory results. The acid concentration may of course be varied, although it is preferred to maintain the product in solution during hydrolysis.

I claim:

1. In the process for the preparation of 1-amino-6-chloroanthraquinone, the step which comprises mono-amidating 1,6-dichloroanthraquinone with p-toluenesulfonamide.

2. In the process for the preparation of 1-amino-6-chloroanthraquinone, the steps which comprise mono-amidating 1,6-dichloroanthraquinone with p-toluenesulfonamide, and hydrolyzing the 1 - p - toluolsulfonamido - 6 - chloroanthraquinone to the 1-amino-6-chloroanthraquinone.

3. In the process for the preparation of 1-amino-6-chloroanthraquinone, the steps which comprise mono-amidating 1,6-dichloroanthraquinone with p-toluenesulfonamide, hydrolyzing the 1 - p - toluolsulfonamido - 6 - chloroanthraquinone in concentrated sulfuric acid and precipitating the 1-amino-6-chloroanthraquinone in the form of its sulfate from a sulfuric acid concentration of approximately 70%.

4. The process for preparing 1-amino-6-chloroanthraquinone which comprises reacting 1,6-dichloroanthraquinone with p-toluenesulfonamide in an inert solvent at a temperature of about 170° C., in the presence of an acid binding agent and a copper catalyst, and isolating the 1-p-toluolsulfonamido-6-chloroanthraquinone.

5. As a new compound, 1-p-toluolsulfonamido-6-chloroanthraquinone.

MYRON S. WHELEN.